United States Patent [19]

Kemper

[11] Patent Number: 4,820,164

[45] Date of Patent: Apr. 11, 1989

[54] TODDLER'S TRAINING APPAREL

[75] Inventor: Alicia W. Kemper, Tallahassee, Fla.

[73] Assignee: Innovec, Inc., Tallahassee, Fla.

[21] Appl. No.: 108,956

[22] Filed: Oct. 16, 1987

[51] Int. Cl.$^4$ .................................... G09B 1/06

[52] U.S. Cl. .................................... 434/238; 2/246; 2/400; 2/115; 40/586; 273/DIG. 30; D2/10; D2/209

[58] Field of Search .................... 434/247, 258, 238; 2/115, 244, 246, 400; D2/6, 10, 36, 42, 208, 209, 212, 214, 215, 225, 226; D20/11; 40/586; 273/DIG. 30

[56] References Cited

U.S. PATENT DOCUMENTS

| | | | |
|---|---|---|---|
| 2,965,978 | 12/1960 | Olson | 434/238 |
| 3,237,625 | 3/1966 | Johnson | D2/10 X |
| 3,484,974 | 12/1969 | Culmone | 40/586 |
| 4,354,282 | 10/1982 | Langdon | 2/115 |

*Primary Examiner*—William H. Grieb
*Attorney, Agent, or Firm*—Arthur G. Yeager

[57] ABSTRACT

Training apparel for a toddler with awardable visual prizes available upon successfully reaching selected training stages, the apparel comprising a releasably attachable pad to be worn on the front of the apparel in the vision of the toddler and the toddler's peers and caretakers, the pad containing several figures respectively covered from view by individual releasable patches of overlying fabric.

20 Claims, 2 Drawing Sheets

TODDLER'S TRAINING APPAREL

BACKGROUND OF THE INVENTION

Many training devices and games have been invented to motivate toddlers to learn certain desirable habits. One of the earliest of training programs is toilet training. Soon thereafter games, eating training, walking training, speaking training, learning the alphabet, etc., are to be learned by toddlers. It has long been a technique in such training to provide rewards for the toddler upon reaching certain levels of proficiency or an ultimate goal in the training. Those rewards frequently are displayed in such a fashion that the toddler is continually reminded of reaching the levels or goal and of the higher level or goal to be reached.

It is an object of this invention to provide training apparel for use in training a toddler and in providing a positive reward system for use therewith toward desired behavioral goals without any negative punishment involved in such system. It is another object of this invention to provide apparel upon which a removable reward panel can be displayed. Still other objects will become apparent from the more detailed description which follows.

BRIEF SUMMARY OF THE INVENTION

This invention relates to a toddler's training apparel having removably fastened to the front thereof a prize reward and display panel on which are attached a plurality of small figures appealable to toddlers, each such figure being covered with a small releasable patch.

In specific preferred embodiments, the panel is attached to the apparel by cooperating strips of fabric hooks and fabric loops, for example, by VELCRO brand fastener. The preferred apparel also includes an elongated tab attached at one of its sides to the waistband of the panty apparel and having a strip of fabric loops on it permitting it to alternatively be within the panty apparel or to hang outside of a pair of outer shorts or pants and to support the prize reward panel.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
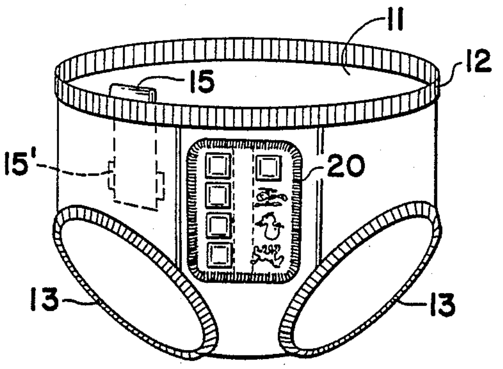
FIG. 1 is a perspective view of the panty apparel and reward panel in accord with the first embodiment of this invention.

The detailed features of this invention can best be understood by reference to the accompanying drawings. The toddler's panty apparel 11 of this invention may be any commercially available cotton training pants modified in a manner as will be described hereinafter. Panty 11 has a waistband 12 and two leg holes 13. Generally the knitting around the waistband 12 and the leg holes 13 is different from the knitting of the body of the panty so as to provide a certain elastic gathering that will make waistband 12 and leg holes 13 fit snugly around the waist and legs of the toddler. On the front of the panty 11 is a removable panel 20 which serves to hold certain reward symbols. Panel 20 and the symbols will be described in more detail below. There also is an elongated tab 15 fastened to waistband 12 and hanging downward inside panty 11, preferably retained inwardly of and by a loop shown by broken lines 15'.

Figure 2:
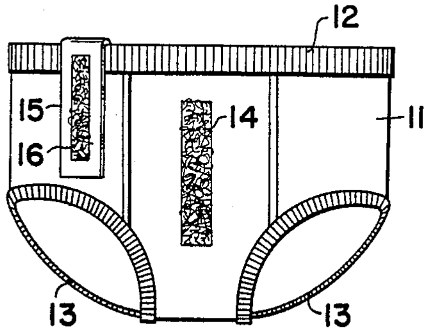
FIG. 2 is a front elevational view thereof with the panel removed therefrom.
Figure 3:
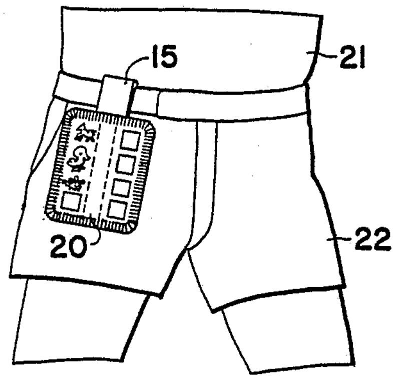
FIG. 3 is a perspective view of the reward panel being displayed over outer shorts.

In FIG. 2 panty or underpants 11 is shown with panel 20 removed and with tab 15 hanging outside of underpants 11. A vertical strip 14 is shown attached vertically on the front of panty 11, but if found desirable, strip 14 may be attached horizontally. This strip 14 is covered with fabric loops to fasten panel 20 thereto. Tab 15 is attached at one of its ends to waistband 12 and may be hung downward inside or outside of underpants 11. Strip 16 also contains fabric loops which are capable of detachably connection to fabric hooks 25 on the back side of the display panel 20. The primary purpose for tab 15 is to provide a support for panel 20 whenever outer shorts or pants are worn over underpants 11. Tab 15 is allowed to hang outside the outer shorts, and panel 20 is attached thereto as seen in FIG. 3. Of course, another display panel may also be attached via tab 15 so that two display panels may be attached to underpants 11, if desired.

Figure 4:
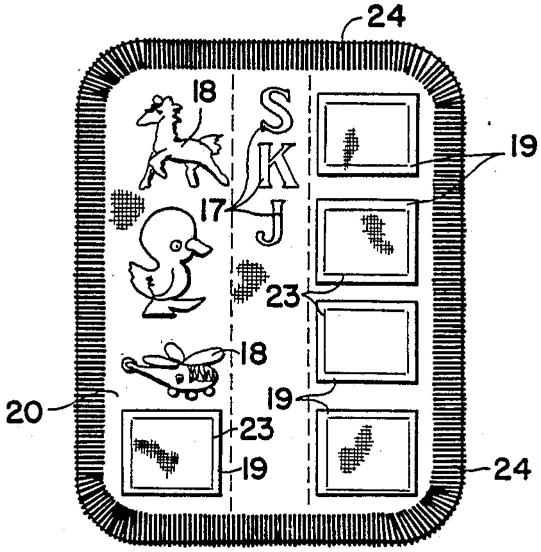
FIG. 4 is a top plan view of the display panel of this invention.
Figure 5:
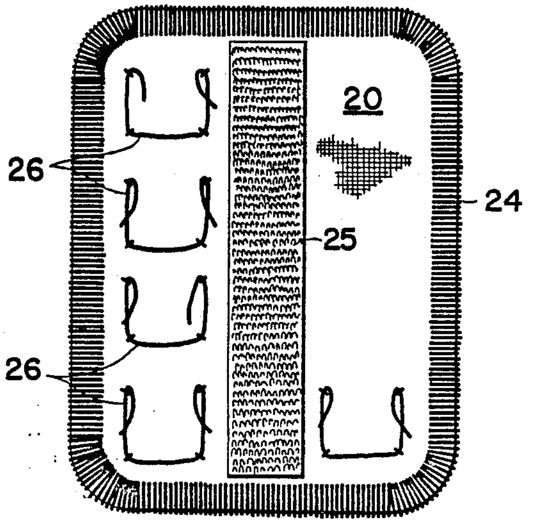
FIG. 5 is a bottom plan view of the panel of FIG. 4.

In FIGS. 4–5 the details of panel 20 are depicted and preferably panel 20 is a relatively stiff fabric with a soft thread whipping 24 around the outer edges thereof. Initials 17 may be provided in the middle to represent the toddler's name. A series of Figures 18 are sewn or otherwise firmly attached to panel 20 to serve as rewards or prizes for the wearer upon reaching certain training levels or goals. The figures may be in any convenient arrangement and each FIG. 18 initially is covered with a plain, preferably colored, patch 19 sewn onto panel 20 by ordinary stitching or by a quick release type of stitching 23, e.g. basting stitch, darning stitch, tack stitch, or the like. Such stitching should be easily removed by an adult, but not easily removable by the toddler. As a reward is earned stitching 23 is removed along with its patch 19 to uncover a prize Figure 18. On the backside of panel 20, as seen in FIG. 5, there are seen threads 26 which comprise part of release stitching 23. There also is a cooperating strip 25 of fabric hooks that releasably attach to fabric loops on strip 14 or 16 to hold panel 20 in an appropriate display position. It is obvious that Figure 18 may be anything that appeals to toddlers. Shown here are figures of animals, but they may include tin toys, rattles, cartoons, bright colored patches, or any other item of interest to the wearer.

Figure 6:
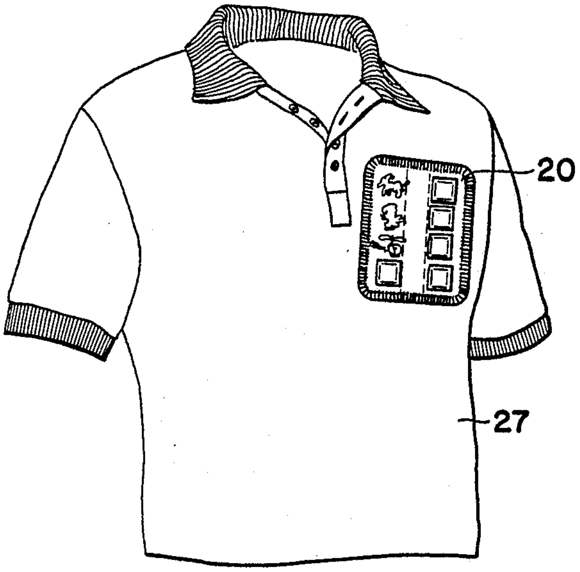
FIG. 6 is a perspective view of the reward panel attached to a shirt apparel in accord with a second embodiment of this invention.

As shown in FIG. 1 panel 20 may be oriented for the toddler to see it, and in FIG. 3 for the outside world to see it, and in FIG. 6 such a panel 20 is shown being worn on a shirt apparel 27. Similarly, panel 20 could be worn on a dress, coat, jacket, pants, or any other wearing apparel. In toilet training a toddler, for example, the system would be that a clean pair of training pants or panty bearing the reward panel would be put on the toddler in the morning. Each time the toddler successfully uses the toilet, another prize Figure 18 would be uncovered by removal of a patch 19 from the panel 20. If the toddler messes up the pants, such pants and the reward panel 20 would be removed and other training pants would be put onto the toddler, but these pants would not have the capability to attach the reward panel 20. Each day, the clean training pants accepting the reward panel 20 with any already achieved prizes exposed would be placed onto the toddler. Of course, more than one panel may be needed for some toddlers for use in prolonged training. The shirt form shown in FIG. 6 may best be used for the training of proper eating habits, for example.

Figure 7:
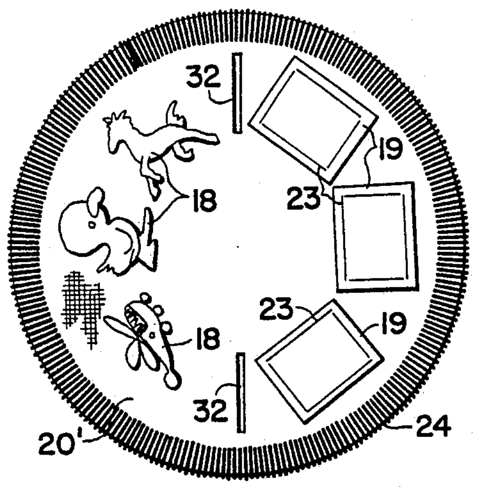
FIG. 7 is a top plan view of another reward panel of this invention.
Figure 9:
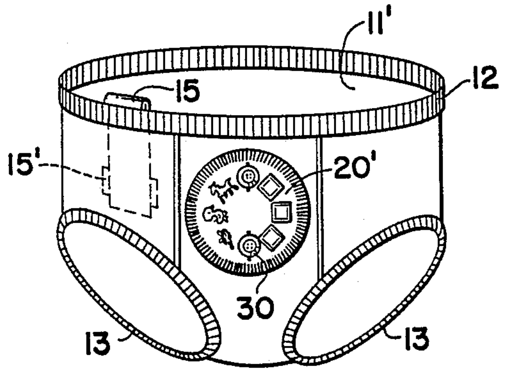
FIG. 9 is a perspective view of the panty apparel and reward panel of FIG. 7 in accord with a third embodiment of this invention.
Figure 10:
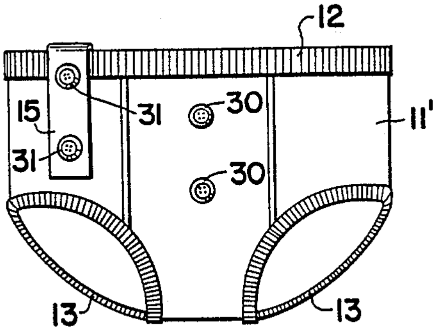
FIG. 10 is a front elevational view thereof with the panel removed therefrom.

Illustrated in FIGS. 7, 9, and 10 is a third embodiment of the training pants 11' and panel 20' with corresponding numerals being indicative of corresponding parts. However, panel 20' is herein shown as having a generally circular configuration with the prize Figures 18 arranged in a circular fashion and with the figures being shown upright when looking from the center of such panel. In lieu of the loop strips 14 and 16, the pants 11' include two sets of spaced buttons 30 and 31 on the front of the pants 11' and tab 15 respectively. Panel 20 includes spaced buttonholes 32 which cooperate with either set of buttons 30 and 31 to removably attach panel 20' thereto. It is to be understood that buttons 30 may be located horizontally rather than vertically, if desired. Also, snap fasteners may be substituted for the buttons and buttonholes without departing from this invention.

Figure 8:
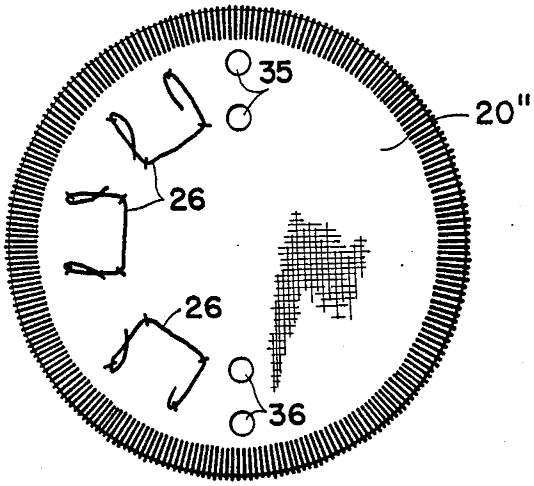
FIG. 8 is a bottom plan view of an additional reward panel shown for use with the panty apparel of FIGS. 11 and 12.
Figure 11:
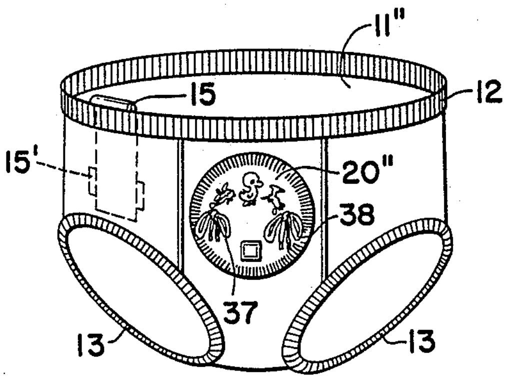
FIG. 11 is a perspective view of the panty apparel and reward panel in accord with a fourth embodiment of this invention.
Figure 12:
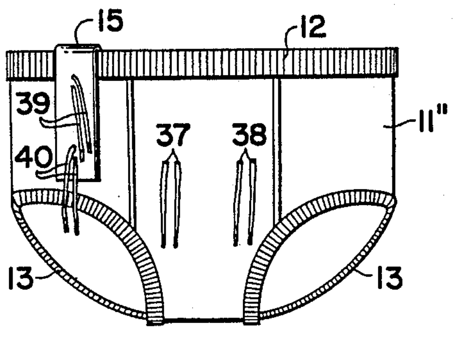
FIG. 12 is a front elevational view thereof with the panel removed therefrom.

A fourth embodiment of the training pants 11'' and panel 20'' is shown in FIGS. 8, 11, and 12. Panel 20'' includes two pairs of spaced openings 35 and 36 through which suitable pairs of ties 37 and 38, attached to the front of pants 11'', are threaded and tied in bows as shown in FIG. 11. Other pairs of ties 39 and 40 are attached to tab 15 for alternate attachment of panel 20'' thereto. This embodiment may be particularly appealing to female toddlers where the ties may be of ribbon or the like.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. Toddler's training reward system comprising underpants including a waist encircling band, leg encircling bands, and front and back body covering portions, a display panel, means for removably fastening said display panel to said underpants, said display panel having on its front side a plurality of small figures appealable to a toddler, a plurality of patches respectively covering said figures and means for releasably attaching said patches to said display panel.

2. The system of claim 1 wherein said means for removably fastening includes a fabric hook and loop fastening device between said panel and said underpants, said fastening device having a strip of fabric loops attached to said front portion of said underpants and a corresponding strip of fabric hooks being attached to a back side of said display panel.

3. The system of claim 1 wherein said means for removably fastening includes at least one button attached to said front portion of said underpants, and a cooperating buttonhole through said display panel receiving said button therethrough to dispose same forwardly of said panel.

4. The system of claim 1 wherein said means for removably fastening includes at least a pair of elongated ties attached to said front portion of said underpants and a cooperating pair of openings extending through said display panel respectively receiving said ties whereby said ties are releasably fastenable together forwardly of said display panel to releasably affix said display panel to said underpants.

5. The system of claim 1 wherein said panel includes a semistiff sheet of fabric.

6. The system of claim 1 wherein each said figure is permanently affixed to said panel.

7. The system of claim 1 further comprising an elongated tab attached to said waist encircling band of said underpants with the free end capable of being hung inside or outside of said underpants, and attaching means on said tab facing outwardly when said tab hangs outside said underpants to detachably secure said display panel thereto.

8. The system of claim 7 further comprising retaining means inside said underpants for releasably engaging said tab when said tab hangs inside said underpants.

9. The system of claim 7 wherein said attaching means on said tab includes at least one button adapted to fit through a cooperating buttonhole through said display panel to dispose same forwardly of said panel.

10. The system of claim 7 wherein said attaching means on said tab includes at least a pair of elongated ties adapted to fit respectively through a cooperating pair of openings extending through said display panel whereby said ties are releasably fastenable together forwardly of said display panel to releasably affix said display panel to said tab.

11. The system of claim 2 further comprising an elongated tab attached to said waist encircling band of said underpants with the free end capable of being hung inside or outside of said underpants, and a strip of fabric loops generally coextensive with said tab and facing outwardly when said tab hangs outside said underpants, said strip of fabric loops on said tab adapted to receive and be attachable to said strip of fabric hooks on said display panel.

12. A display panel for attachment to a toddler's training apparel comprising a panel, means for removably fastening said panel to an apparel, said panel having on its front side a plurality of small figures appealable to a toddler, a plurality of patches respectively covering said figures, and means for releasably attaching said patches to said panel, said patches being respectively removed to provide rewards for accomplishing training levels set for such rewards.

13. The display panel of claim 12 wherein said means for removably fastening includes a fabric hook and loop fastening device between said panel and an apparel, said fastening device having a strip of fabric loops attachable to a front side of an apparel and a corresponding strip of fabric hooks being attached to a back side of said panel.

14. The display panel of claim 12 wherein said panel includes a semi-stiff sheet of fabric.

15. The display panel of claim 12 wherein each said figure is permanently affixed to said panel.

16. The display panel of claim 12 wherein said means for removably fastening includes at least one button attachable to a front side of an apparel and a cooperating buttonhole through said panel receiving said button therethrough to dispose same forwardly of said panel.

17. The display panel of claim 12 wherein said means for removably fastening includes at least a pair of elongated ties attachable to a front side of an apparel and a cooperating pair of openings extending through said panel respectively receiving said ties whereby said ties are releasably fastenable together forwardly of said panel to releasably affix said panel to an apparel.

18. Toddler's training apparel comprising an apparel, a display panel, means for removably fastening said display panel to said apparel, said display panel having on its front side a plurality of small figures appealable to a toddler, a plurality of patches respectively covering said figures, and means for releasably attaching said patches to said display panel, said patches being respectively removed to provide rewards for accomplishing training levels set for such rewards.

19. The apparel of claim 18 wherein said means for removably fastening includes a fabric hook and loop fastening device between said display panel and said apparel, said fastening device having a strip of fabric loops attached to a front side of said apparel and a corresponding strip of fabric hooks being attached to a back side of said display panel.

20. The apparel of claim 19 wherein said apparel is underpants, said underpants including an elongated tab attached to a waistband thereof with its free end being positionable inside or outside of said underpants, and a strip of fabric loops attached to said tab and facing outwardly when said tab hangs outside of said underpants to selectively detachably secure said strip of fabric hooks of said display panel thereto.

* * * * *